United States Patent [19]

Fujio

[11] 4,250,686

[45] Feb. 17, 1981

[54] CAP SEAL FITTING MACHINE FOR A CONTAINER

[75] Inventor: Masaaki Fujio, Suita, Japan

[73] Assignee: Fuji Seal Industry Co. Ltd., Osaka, Japan

[21] Appl. No.: 84,151

[22] Filed: Oct. 12, 1979

[30] Foreign Application Priority Data

Oct. 23, 1978 [JP] Japan .................. 53-130334

[51] Int. Cl.³ .................. B65B 7/28; B67B 3/04
[52] U.S. Cl. .................. 53/296
[58] Field of Search ............ 53/296, 297, 298, 307, 53/133

[56] References Cited

U.S. PATENT DOCUMENTS

| | | | |
|---|---|---|---|
| 1,377,279 | 5/1921 | Rosengren | 53/297 X |
| 2,343,358 | 3/1944 | Anderson | 53/296 |
| 2,680,549 | 6/1954 | Levy | 53/295 |
| 3,888,067 | 6/1975 | Cross et al. | 53/296 X |
| 3,939,625 | 2/1976 | Remele et al. | 53/307 X |
| 4,065,909 | 1/1978 | Mueller | 53/296 X |

*Primary Examiner*—Horace M. Culver
*Attorney, Agent, or Firm*—Michael A. Painter

[57] ABSTRACT

A cap seal fitting machine for a container, wherein a cap seal of a film piece is punched from a film sheet by a punching means and is held onto one of molds which are radially arranged in the periphery of a rotary disc plate which is intermittently turned around its axis, wherein the cap seal held on the mold is molded into a desired shape by a molding means, and wherein the cap seal molded is transferred from the mold to the top of the container for fitting thereon by a transfer means. The punching means, the molding means, and the transfer means are operated while the rotary disc plate is stopped.

5 Claims, 6 Drawing Figures

CAP SEAL FITTING MACHINE FOR A CONTAINER

BACKGROUND OF THE INVENTION

The present invention relates to a machine for fitting a cap seal automatically onto a top of a container such as a bottle.

When a cap seal of heat-shrinkable film is fitted onto a cap of a container such as a bottle, usually, a film tube cut into a desired length or a film piece punched into a desired shape is used.

However, if the neck of the bottle to be fitted with the cap seal is short, the film piece is preferably used rather than the film tube. But it is rather difficult to position the cap seal of the film piece in the proper position on the top of the bottle in order to fit the cap seal onto the cap of the bottle.

SUMMARY OF THE INVENTION

It is an object of the present invention to provide a cap seal fitting machine free from the aforementioned defect, which is reliable, quick, and simple.

According to the present invention, there is provided a cap seal fitting machine for a container, comprising: a frame; a rotary disc plate which is pivotally mounted to the frame and is intermittently turned around its axis; a plurality of molds, each having a suction hole which extends radially in its center, for holding a cap seal, which are radially arranged in the periphery of the rotary disc plate at a certain angle interval; a punching means for punching the cap seal to be fitted onto a cap of a container from a film sheet, mounted to the frame, comprising a die and a punch which cooperate each other, this means being adapted to be operated when one of the molds is positioned directly under the punching means while the rotary disc plate is stopped; a molding means for molding the cap seal held on the mold into a desired shape, mounted to the frame, including a heat mold which is adapted to move onto one of the molds and cooperates therewith while the rotary disc plate is stopped; and a cap seal transfer means, mounted to the frame, which is adapted to transfer the cap seal molded from one of the molds to the top of the container while the rotary disc plate is stopped.

BRIEF DESCRIPTION OF THE DRAWINGS

The present invention will become more clealy understood from the following description of a preferred embodiment thereof with reference to the accompanying drawings, in which.

DESCRIPTION OF THE PREFERRED EMBODIMENT

Figure 1:
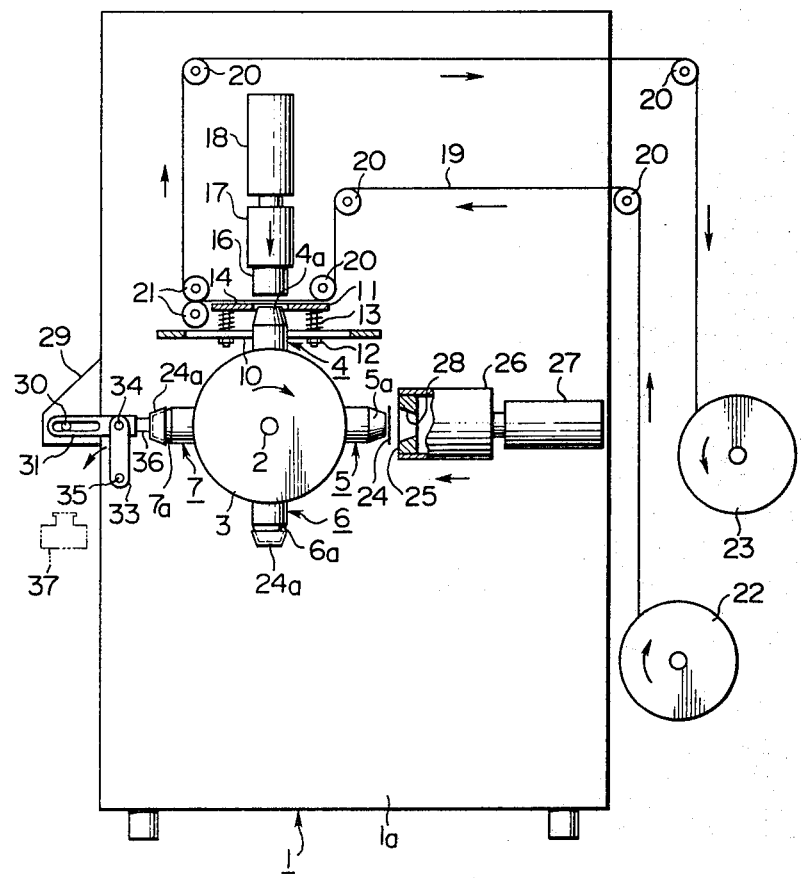
FIG. 1 is a schematic view of a cap seal fitting machine according to the present invention.
Figure 2:
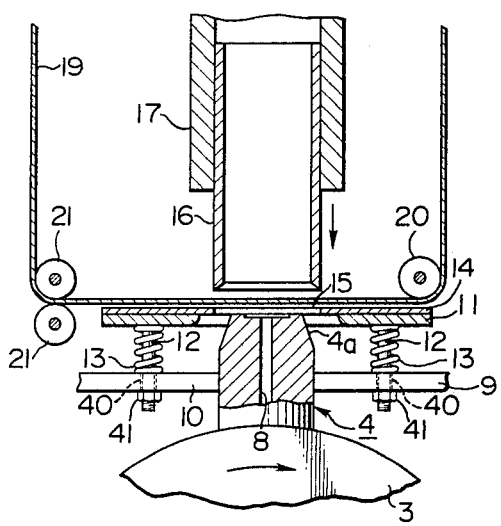
FIG. 2 is an enlarged fragmentary longitudinal cross-section of the machine in FIG. 1, for explaining the punching of a cap seal to be fitted onto a cap of a container.
Figure 3:
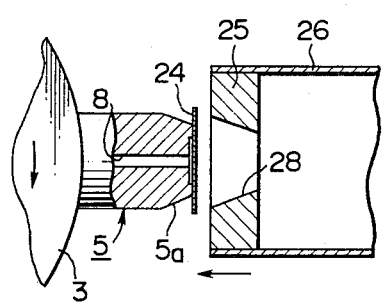
FIG. 3 is an enlarged fragmentary longitudinal cross-section of the machine in FIG. 1, for explaining the molding of the cap seal into a cup shape.
Figure 4:
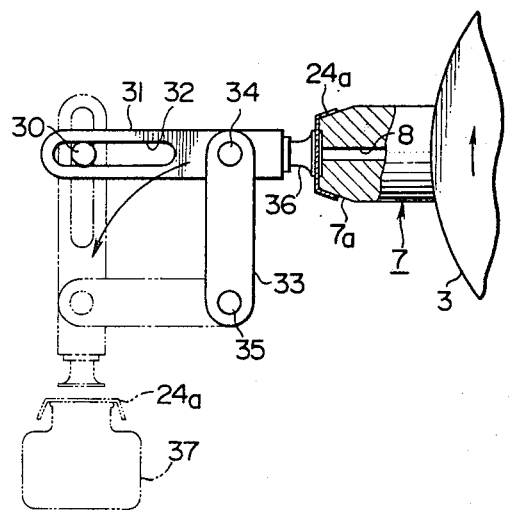
FIG. 4 is an enlarged fragmentary longitudinal cross-section of the machine in FIG. 1, for explaining the transfer of the cap seal from the mold of the machine to the top of the container.

Referring to drawings, there is shown a frame 1 comprising a front plate 1a. A rotary disc plate 3 is mounted onto a drive shaft 2 which is pivotally mounted to the front plate 1a and is connected to a drive means (not shown). The rotary disc plate 3 is turned intermittently around the axis of the shaft 2 clockwise in FIG. 1.

Four molds 4, 5, 6 and 7 are radially arranged in the periphery of the disc plate 3 at right angle interval. Each mold 4, 5, 6 or 7 possesses a tapered free end 4a, 5a, 6a or 7a which projects radially apart from the shaft 2, i.e. upwards, rightsidewards, downwards and leftsidewards in FIG. 1, respectively, and also includes a central hole 8 along its axis for holding a cap seal.

A support plate 9 having a slot 10 in its center is mounted to the front plate 1a so that the mold 4 may be passed through the slot 10. A receive plate 11 is fixed to the support plate 9, that is, screw bolts 12 fixed below the receive plate 11 are inserted into holes 40 formed in the support plate 9 and their lower ends are stopped by nuts 41 to the support plate 9. The receive plate 11 is flexibly supported above the support plate 9 by coil springs 13 which are wound round the screw bolts 12 between the support plate 9 and the receive plate 11.

Figure 5A:
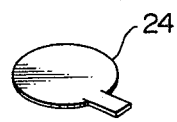
FIGS. 5a and 5b are perspective views of the cap seal.
Figure 5B:
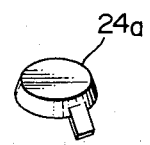

A die 14 having a central hole 15 is mounted to the receive plate 11 having a coaxial central hole 15 of the die 14. A punch cutter 16 for punching a film piece from a heat-shrinkable film belt 19 is positioned right above the hole 15 of the die 14. The lower end of the punch cutter 16 conforms to the shape of the film piece 24, as shown in FIG. 5a. The punch cutter 16 is fitted in a cylindrical member 17 which is connected to a cylinder means 18 which is mounted to the front plate 1a and moves the cylindrical member 17 up and down.

The heat-shrinkable film belt 19 fed from a feed roll 21 onto the die 14 via guide rollers 20. Then, the heat-shrinkable film belt punched is rolled up to a scrap roll 23 via feed rollers 21 and guide rollers 20.

While the rotary disc plate 3 and the heat-shrinkable film belt 19 are stopped, the punch cutter 16 is moved down into the hole 15 of the die 14 in order to punch the film piece 24, as shown in FIG. 5a. During the punching operation, the die 14 and the receive plate 11 are lowered by the punch cutter 16 against the coil springs 13 while the central hole 8 of the mold 4 is sucked by a suction means (not shown), and thus the film piece 24 punched is held to the free end 4a of the mold 4. Then, the rotary disc plate 3 is rotated through 90°, and the film piece 24 is moved to the position of the mold 5.

A heat mold ring 25 which cooperates with the mold is fitted in a cylindrical member 26, and is arranged in the right hand side of the mold 5 in FIG. 1. The cylindrical member 26 is connected to a cylinder means 27 mounted to the front plate 1a of the frame 1, and is moved in the right and left directions by the cylinder means 27. The heat mold ring 25 is provided with a tapered hole 28 which is contacted with the tapered free end 5a of the mold 5.

The heat mold ring 25 is driven in the left side direction onto the tapered free end 5a of the mold 5, and thereby the film piece 24 sucked onto the free end 5a of the mold 5 is molded into a cup shape 24a, as shown in FIG. 5a.

The rotary disc plate 3 is turned through 90°, and the cup-shaped piece 24a is still held by the mold 6. The rotary disc plate 3 is then turned through 90°, and the cup-shaped piece 24a is positioned on the mold 7 in FIG. 1.

A mechanism for transferring the cup-shaped piece 24a from the tapered free end 7a of the mold 7 to the top of a bottle 37, is arranged in the left hand side of the mold 7 in FIG. 1 and is mounted to the frame 1.

That is, a bracket 29 is secured to the frame 1. A horizontal pin 30 is fixed to the bracket 29. A transfer lever 31 having a slot 32 in its one end portion is adapted to pivot around the pin 30 which is engaged in the slot 32. The free end of a drive lever 33 is pivotally connected to the other end portion of the transfer lever 31 by a link pin 34, and the fixed end of the drive lever 33 is pivotally mounted to a horizontal pin 35 which is mounted to the front plate 1a of the frame 1. A suction cup 36 is disposed to the other end of the transfer lever 31.

While the rotary plate 3 is stopped, the transfer lever 31 is pivoted to the horizontal position by the drive lever 33 so that the suction cup 36 may be contacted with the cup-shaped piece 24a held on the mold 7.

Then, the suction of the mold 7 is switched off and simultaneously the suction of the suction cup 36 is switched on, thereby the cup-shaped piece 24a being held by the suction cup 36.

The transfer lever 31 is pivoted down through 90° by the drive lever 33 while the suction cup 36 holds the cup-shaped piece 24a, and the cup-shaped piece 24a is transferred to direct above the bottle 37 on a conveyer (not shown). Then, the cup-shaped piece 24a is released from the suction cup 36 onto the top of the bottle 37 by stopping the suction of the suction cup 36. The cap of the bottle 37 is then sealed by heating in a conventional manner.

In this embodiment described above, the rotary disc plate 3 is repeatedly tured through 90°, and while the rotary disc plate 3 is stopped, the punching of the film piece 24, molding of the film piece 24 into the cup-shaped piece 24a, and the transferring of the cup-shaped piece 24a from the mold to the bottle 37 are performed simultaneously.

Although the present invention has been shown and described with reference to a preferred embodiment thereof, many changed and modifications can be made by one skilled in the art without departing from the scope of the present invention.

I claim:

1. A cap seal fitting machine for a container, comprising:
   (a) a frame;
   (b) a rotary disc plate which is pivotally mounted to the frame and is intermittently turned around its axis;
   (c) a plurality of molds, each having a suction hole which extends radially in its center, for holding a cap seal, which are radially arranged in the periphery of the rotary disc plate at a specified angular interval;
   (d) punching means for punching the cap seal to be fitted onto a cap of a container from a film sheet, mounted to the frame, comprising a die and a punch which cooperate each other, said punching means being adapted to be operated when one of the molds is positioned directly under the punching means while the rotary disc plate is stopped;
   (e) molding means for molding the cap seal held on the mold into a desired shape, mounted to the frame, including a heat mold which is adapted to move onto one of the molds and cooperating therewith while the rotary disc plate is stopped; and
   (f) cap seal transfer means, mounted to the frame, said cap seal transfer means being adapted to transfer the cap seal molded from one of the molds to the top of the container while the rotary disc plate is stopped.

2. A machine according to claim 1 wherein the cap seal transfer means comprises a transfer lever, a drive lever and a suction cup fixed to the free end of the transfer lever, for holding the cap seal, the two levers being adapted to pivot at their pivot end portions, respectively, the two levers being pivotally connected to each other at their free end portions.

3. A machine according to claim 2, wherein when the suction cup is contacted with the molded cap seal held on the one of the molds, the suction force of a suction means for the mold is switched off and the suction force of a suction cup is switched on at the same time.

4. A machine according to claim 3 wherein the four molds are arranged at right angle interval.

5. A machine according to claims 1, 2, 3 or 4 wherein the cap seal is molded into a cup shape.

* * * * *